Figure 1:
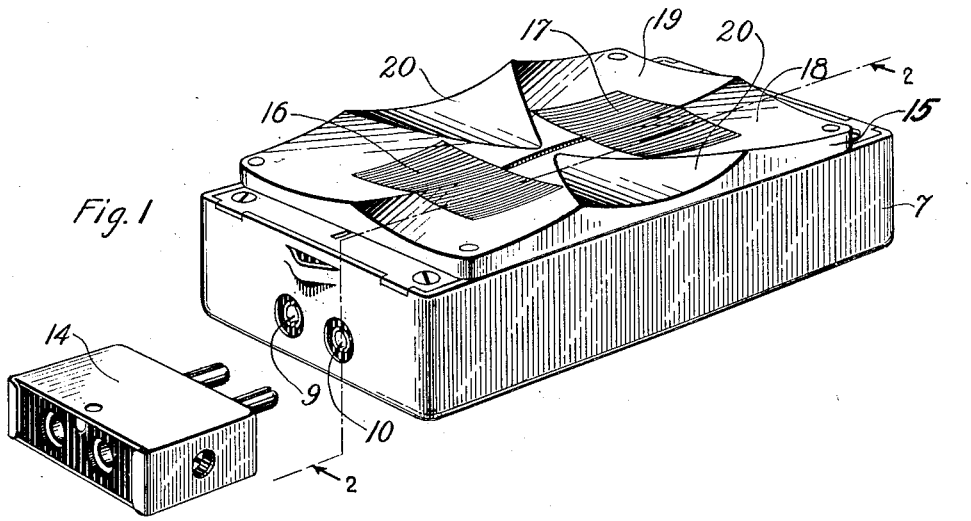

H. M. STOLLER.
FAULT LOCATOR FOR ELECTRIC CABLES.
APPLICATION FILED AUG. 17, 1920.

1,412,376.

Patented Apr. 11, 1922.

Inventor:
Hugh M. Stoller
by Joel Ch. Palmer
Atty.

UNITED STATES PATENT OFFICE.

HUGH M. STOLLER, OF NEW YORK, N. Y., ASSIGNOR TO WESTERN ELECTRIC COMPANY, INCORPORATED, OF NEW YORK, N. Y., A CORPORATION OF NEW YORK.

FAULT LOCATOR FOR ELECTRIC CABLES.

1,412,376.  Specification of Letters Patent.  Patented Apr. 11, 1922.

Application filed August 17, 1920. Serial No. 404,081.

*To all whom it may concern:*

Be it known that I, HUGH M. STOLLER, a citizen of United States of America, residing at New York, in the county of New York and State of New York, have invented certain new and useful Improvements in Fault Locators for Electric Cables, of which the following is a full, clear, concise, and exact description.

This invention relates to the location of faults in electric cables, such as for example, telephone cables.

As commonly constructed, telephone cables consist of twisted pairs of conductors wrapped with paper. The breaking down of the insulation between any two conductors, or the conductor and the metallic sheath which encloses the cable, gives rise to the so-called "faults." Thus, there may be a grounded conductor, i. e. one which is electrically connected with the outer sheath; a cross between conductors not of the same pair; and a short circuit between conductors of the same pair; or all of these faults at one and the same time. One cause for such conditions is the entrance of moisture into the cable, setting up conducting paths through the otherwise insulating medium.

It has been the practice heretofore to locate such troubles by passing an intermittent current through the conductor which has failed, and then determining by suitable detecting means at what point the electric current ceases to flow. Usually, this detecting means consists of two parts, an exploring coil, having a magnetic core, and second, a device for detecting the current induced in said coil by the intermittent current flowing in the conductor. The magnetic core is preferably made in a U-shape, with a coil on each leg, means being provided whereby the coils may be connected together to produce a cumulative effect whether the two pole-pieces undergo a like or unlike magnetic effect. The distance between the centers of the two polepieces is made approximately equal to the distances between the centers of adjacent half twists in the cable conductors in order to adapt the locator for the detection of short circuits. Where there are no stray currents flowing in the cable sheath, or where such currents are so small as to be negligible, no care need be taken to place the locator in a position where the two coils will be symmetrical to the axis of the cable. Since the maximum magnetic linkage is desired between the conductor and the exploring coil, in order that the fault may be located with precision, it is necessary to provide some sort of a guide on the face plate of the fault locator, in order that the latter may be correctly positioned upon the cable.

It has been found that, if grooves or depressions in the face plate of the fault locator be so positioned that, when the latter is placed on the cable sheath, its yoke is parallel to the axis or center line of the particular conductor which is at fault, the maximum magnetic linkage is had, and consequently the fault may be accurately located.

Figure 2:
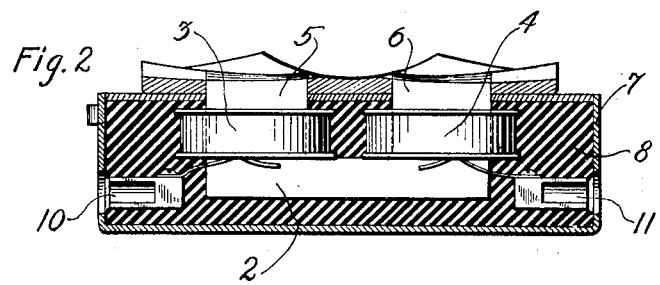
Figure 3:
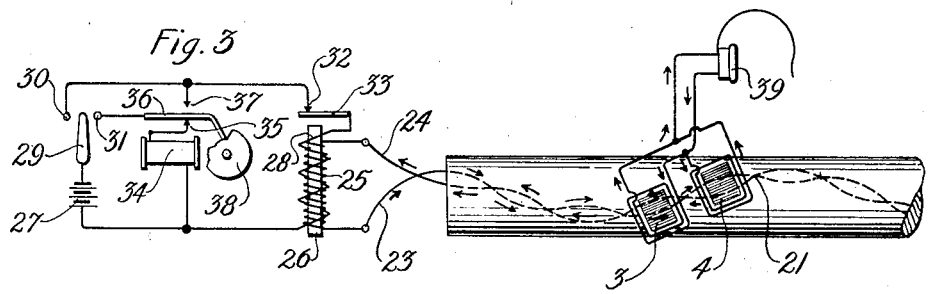

In the drawings, Fig. 1 shows a perspective view of the fault locator. Fig. 2, shows a view partly in section on line 1—1 of Fig. 1; Fig. 3 shows the positioning of the fault locator on the cable to be tested, together with the current arrangement at the source of testing current.

In the construction of the fault locator, in accordance with this invention, the U-shaped laminated core 2, having energizing coils 3 and 4, mounted on legs 5 and 6 respectively, is mounted within a suitable casing 7, and insulated therefrom by the insulating medium 8. In each end of the casing 7 there is provided two jacks, such as for example on the end shown in Figs. 1, 9 and 10, which are electrically connected with the terminals of coils 3 and 4. The electrical connections between these jacks and the coils are so arranged that by choosing the proper pair of terminals a cumulative effect may be had in the current detecting means regardless of whether the current flowing in the conductor produces a like or unlike magnetic effect on the two poles 5 and 6. The plug 14, is adapted to engage the terminal jacks, and to convey the induced current to the current detecting means.

The face plate 15, made of a non-magnetic material, such as brass, is secured to the casing 7 in any suitable manner, and is provided with two apertures 16 and 17, in which the pole pieces 5 and 6 fit. The diagonal grooves 18 and 19 are so positioned as to allow the placing of the fault locator in such a manner that the axis of the yoke of the core is in line with the lay of the conductor. The angle which these diagonal grooves or depressions should make with the axis of the laminated magnet core may be readily determined in any particular case by considering the angular displacement of the conductors in the cable. Any one of the many pairs which go to make up a cable, save perhaps those located at the very center thereof, may be considered as having two separate and distinct lines of travel with respect to the center line or axis of the cable. Thus, the conductor proceeds linearly in the form of a sine wave, and also, simultaneously, revolves about the axis of the cable. By following a point along any conductor it may be readily shown that the tangent of the angle which the conductor makes with the axis of the cable, is $\frac{2\pi r}{L}$, where $r$ = radical distance of the conductor from the center line of the cable, and $L$ = the length of one complete convolution of the conductor. In a cable having about 600 pairs, L will be about 22 inches, and $r$, assuming the conductor chosen is in the outer layer, will be 1.25 inches. Substituting these values in the equation cited above, the angle obtained is approximately twenty degrees. Since the greatest number of faults are to be found in the outer layers of the conductors, it is sufficient for all practical purposes if the angular displacement of these conductors alone be considered.

The groove or depression, 20 is provided in order that the fault locator may be adapted to detect grounds and crosses. When this groove is used, the yoke of the exploring magnet is crosswise to the axis of the cable, and unlike magnetic effects are produced in the two coils, 3 and 4. By selecting the proper terminal jacks, however, this effect will be made cumulative in the detecting instrument.

Fig. 3 shows a short circuit at 21 between the two conductors 23 and 24. These conductors are shown electrically connected to the secondary winding 25 of the transformer 26, which forms a part of the current supply apparatus. The essential features of the latter will be briefly described. One side of the battery 27 is connected to the primary winding 28 of the transformer 26, and the other side to a movable switch arm, 29, adapted to engage either terminal 30 or 31. The terminal 30 is connected to the contact 32 of the transformer 26, which is normally in contact with the armature 33. The movement of the armature 33 is controlled by the primary winding 28, and is connected thereto. The side of the battery 27 which is connected to the primary winding 28 is also connected to the winding of the electromagnet 34, the other terminal of said winding being connected to contact 35. This contact is normally in engagement with the contact arm 36, which is connected to the terminal 31. Contact 37, which is connected to contact 32, is normally disconnected from the circuit, but upon energization of electromagnet 34, and attraction of armature 38, contact 35 is disengaged from the contact arm 36, which moves into engagement with contact 37. The purpose of the switch arm 29, is to provide means whereby either an alternating current or an intermittent alternating current may be used in testing. If alternating current is desired, the switch arm 29 is placed in engagement with terminal 30, while on the other hand the engagement of terminal 31 with the switch arm 29 will permit the use of an intermittent alternating current.

Assuming that switch arm 29 is in engagement with terminal 30, current passes from the battery 29 through the primary winding 28 of the transformer 26, through armature 33 to contact 32, thence through terminal 30 and switch arm 29 to battery. This results in the attraction of armature 33, disengaging contact 32, and deenergizing the primary winding 28. Armature 33 then reverts to its normal position and engages with contact 32. The cycle of operations is then repeated, resulting in the production of an alternating current in the secondary winding 25, which then flows through the conductors 23 and 24.

When switch arm 29 is in engagement with terminal 31 current passes from the battery 27 through the winding of the electromagnet 34, through contact 35 to contact arm 36, to contact 31, switch arm 29 and to battery. This causes the attraction of armature 38, which disengages contact arm 36, from contact 35, and engages it with contact 37. Thus, a current is then sent through the primary winding 28 in the same manner as heretofore described. The addition of the auxiliary means of breaking and making the circuit results in the production of an intermittent alternating current.

In order to show the manner in which the fault at 21 is located, Fig. 3 is assumed to represent the condition at some instant of time, the direction of flow in the conductors 23 and 24, of the testing current from the battery 27, at this instant, being as indicated by the arrows.

The magnetizing forces which are set up in the field of these conductors form a complete magnetic path for each half twist of the conductors of the pair. The direction of the forces, however, being reversed in each half twist, an unlike effect will be induced in coils inserted in these two fields. The fault locator is placed is such a manner that groove or depression 19 fits the surface of the cable. The current induced in coils 3 and 4 will then be as shown by the arrows. The electrical connections between these two coils and the current detecting means 39 must then be as shown in Fig. 3 in order that a cumulative effect may be produced. As the fault locator is moved along the cable, the strength of the induced current will vary, it being greater when the conductor is near the surface of the cable at the point of application of the fault locator. Since there will be substantially no current passing through the conductors 23 and 24 beyond the point 21, practically no current will be induced in the coils of the fault locator after this point has been passed. When the approximate position of the fault is reached, the exact location of the pair in the cable is determined, and then the conductors are followed in accordance with their lay in the cable, until the precise point of failure is reached.

What is claimed is:

1. A device for exploring the field of electric cable conductors comprising a coil with a magnet core having in its positioning surface a depression at an angle with the axis of said coil, said angle corresponding to the angle between a conductor of the cable and the axis of said cable.

2. A device for exploring the field of electric cable conductors, comprising a coil with a magnet core having in its positioning surface a plurality of depressions at an angle with the axis of said core, said angle being equal to the angle between the conductors comprising the outer layer in the cable and the axis of said cable.

3. A device for exploring the field of electric cable conductors comprising a U-shaped electromagnet having a positioning surface adapted to fit the surface of the cable, when presented thereto with the yoke of said magnet perpendicular to the axis of said cable and when presented thereto with the yoke of said magnet at an angle with the axis of said cable corresponding to the angular lay of a conductor in said cable.

4. The method of locating a fault in a conductor of an electric cable, which consists in passing an electric current through said conductor, passing a fault locator over the cable so that the yoke of the magnet of said locator is at an angle with the axis of the cable corresponding to the angular lay of the conductor within the cable, and determining the point at which current ceases to flow through said conductor by means of suitable current detecting means associated with said fault locator.

In witness whereof, I hereunto subscribe my name this 11th day of August A. D., 1920.

HUGH M. STOLLER.